United States Patent
Huang et al.

(10) Patent No.: US 11,349,696 B1
(45) Date of Patent: *May 31, 2022

(54) SYSTEMS AND METHODS TO REDUCE PEAK TO AVERAGE POWER RATIO FOR DUAL SUB-CARRIER MODULATED TRANSMISSIONS IN A WIRELESS NETWORK

(71) Applicant: MARVELL ASIA PTE, LTD., Singapore (SG)

(72) Inventors: Jie Huang, San Jose, CA (US); Hongyuan Zhang, Fremont, CA (US); Yakun Sun, San Jose, CA (US); Rui Cao, Fremont, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 3 days.

This patent is subject to a terminal disclaimer.

(21) Appl. No.: 16/940,718

(22) Filed: Jul. 28, 2020

Related U.S. Application Data (63) Continuation of application No. 16/571,406, filed on Sep. 16, 2019, now Pat. No. 10,735,236, which is a
(Continued)

(51) Int. Cl.
*G08C 17/00* (2006.01)
*H04L 27/26* (2006.01)
(Continued)

(52) U.S. Cl.
CPC .......... *H04L 27/2618* (2013.01); *H04L 27/18* (2013.01); *H04L 27/2628* (2013.01); *H04W 84/12* (2013.01)

(58) Field of Classification Search
None
See application file for complete search history.

(56) References Cited

U.S. PATENT DOCUMENTS 7,957,265 B2 6/2011 Geile et al.
9,094,842 B2 7/2015 Geile
(Continued)

OTHER PUBLICATIONS

IEEE P802.11nTM, IEEE Standard for Information Technology—Telecommunication and information exchange between systems—Local and metropolitan area networks—Specific requirements; Part 11: Wireless LAN Medium Access Control (MAC) and Physcial Layer (PHY) Specifications; Amendment 5 Enhancements for Higher Throughput; "*The Institute of Electrical and Electronics Engineers, Inc.*" Oct. 2009.

(Continued)

*Primary Examiner* — Phirin Sam (57) ABSTRACT

A system includes a modulator, a repetition module, and a phase rotation module. The modulator is configured to (i) modulate data using a first modulation scheme and dual sub-carrier modulation, and (ii) generate modulated symbols for transmission on a plurality of subcarriers. The dual sub-carrier modulation modulates the same information on a pair of subcarriers. The repetition module is configured to repeat the modulated symbols from a first half of the plurality of subcarriers to a second half of the plurality of subcarriers. The phase rotation module is configured to rotate phase of the modulated symbols on selected subcarriers of the second half of the plurality of subcarriers. The selected subcarriers of the second half of the plurality of subcarriers include at least one half of the second half of the plurality of subcarriers.

20 Claims, 6 Drawing Sheets

Related U.S. Application Data continuation of application No. 16/151,870, filed on Oct. 4, 2018, now Pat. No. 10,439,854, which is a continuation of application No. 15/165,713, filed on May 26, 2016, now Pat. No. 10,097,393.

(60) Provisional application No. 62/166,831, filed on May 27, 2015, provisional application No. 62/266,253, filed on Dec. 11, 2015.

(51) Int. Cl.
*H04L 27/18* (2006.01)
*H04W 84/12* (2009.01)

(56) References Cited

U.S. PATENT DOCUMENTS

| | | | |
|---|---|---|---|
| 9,379,918 B1* | 6/2016 | Milbar | H04L 27/22 |
| 9,756,526 B2* | 9/2017 | Yang | H04L 27/2613 |
| 10,097,393 B1 | 10/2018 | Huang et al. | |
| 2004/0156309 A1 | 8/2004 | Chadha et al. | |
| 2005/0195765 A1* | 9/2005 | Sharon | H04L 27/2608 370/330 |
| 2008/0063012 A1 | 3/2008 | Nakao et al. | |
| 2008/0298490 A1* | 12/2008 | Yun | H04L 27/2618 375/260 |
| 2008/0310536 A1* | 12/2008 | Patel | H04L 25/0236 375/260 |
| 2009/0073869 A1 | 3/2009 | Chadha et al. | |
| 2009/0225899 A1 | 9/2009 | Dent | |
| 2010/0098042 A1 | 4/2010 | Dent | |
| 2010/0202334 A1 | 8/2010 | Soliman et al. | |
| 2010/0208837 A1 | 8/2010 | Vetter et al. | |
| 2011/0051845 A1 | 3/2011 | Schmidl et al. | |
| 2011/0064175 A1 | 3/2011 | Leyonhjelm et al. | |
| 2011/0110304 A1 | 5/2011 | Kuchi et al. | |
| 2013/0142149 A1 | 6/2013 | Malladi | |
| 2014/0072307 A1 | 3/2014 | Zamani et al. | |
| 2014/0105120 A1 | 4/2014 | Jose et al. | |
| 2014/0105121 A1 | 4/2014 | Jose et al. | |
| 2015/0257175 A1 | 9/2015 | Ma et al. | |
| 2016/0087765 A1* | 3/2016 | Guey | H04J 11/0079 370/330 |
| 2016/0112143 A1* | 4/2016 | Yu | H04L 27/34 398/65 |
| 2016/0112851 A1 | 4/2016 | Li et al. | |
| 2016/0119452 A1 | 4/2016 | Lee | |
| 2016/0197700 A1 | 7/2016 | Abraham et al. | |
| 2016/0301452 A1 | 10/2016 | Kwon et al. | |
| 2016/0323426 A1 | 11/2016 | Hedayat | |
| 2016/0352552 A1* | 12/2016 | Liu | H04L 5/0053 |
| 2017/0013582 A1* | 1/2017 | Takekawa | H04W 56/0045 |
| 2017/0019281 A1 | 1/2017 | Zhang et al. | |
| 2018/0020489 A1 | 1/2018 | Ma et al. | |
| 2018/0091347 A1 | 3/2018 | Lee et al. | |
| 2018/0097554 A1 | 4/2018 | Guey et al. | |
| 2019/0253295 A1 | 8/2019 | Gao et al. | |

OTHER PUBLICATIONS

IEEE Std 802.11ac/D4.0 "Draft Standard for Information Technology—Telecommunications and information exchange between systems—Local and metropolitan area networks13 Specific requirements, Part 11: Wireless LAN Medium Access Control (MAC) and Physical Layer (PHY) specifications: Amendment 4 Enhancements for Very High Throughput for Operation in Bands below 6 GHz," The Institute of Electrical and Electronics Engineers, Inc., pp. 1-408 (Oct. 2012).

IEEE P802.11ax/D0.1 Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendments: Enhancements for high efficiency in frequency bands between 1 GHz and 6 GHz; Mar. 2016; 221 Pages.

IEEE P802.11, Wireless LANs, Mar. 2012, 2793 pages.

IEEE 802.16; IEEE Standard for Local and Metropolitan area networks; Part 16: Air Interface for Broadband Wireless Access Systems; IEEE Computer Society and IEEE Microwave Theory and Techniques Society; May 29, 2009; 2082 Pages.

IEEE 802.20; IEEE Standard for Local and Metropolitan Area Networks; Part 20: Air Interface for Mobile Broadband Wireless Access Systems Supporting Vehicular Mobility—Physical and Media Access Control Layer Specification: IEEE Computer Society; Aug. 29, 2008; 1053 Pages.

IEEE Std. P802.11ad/D5.0 '"Draft STANDARD for Information Technology—Telecommunications and information exchange between systems—Loci and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.

IEEE P802.11ah/D1.0 Draft Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications; Amendment 6: Sub 1 GHz License Exempt Operation; Oct. 2013; 394 pages.

"Specification of the Bluetooth System," Master Table of Contents & Compliance Requirements—Covered Core Package version: 4.0; Jun. 30, 2010; 2302 pages.

* cited by examiner

SYSTEMS AND METHODS TO REDUCE PEAK TO AVERAGE POWER RATIO FOR DUAL SUB-CARRIER MODULATED TRANSMISSIONS IN A WIRELESS NETWORK

CROSS-REFERENCE TO RELATED APPLICATIONS

This application is a continuation of U.S. Non-Provisional application Ser. No. 16/571,406 (U.S. Pat. No. 10,735,236), filed on Sep. 16, 2019 which is a continuation of U.S. Non-Provisional application Ser. No. 16/151,870 (now U.S. Pat. No. 10,439,854), filed on Oct. 4, 2018 which is a continuation of U.S. Non-Provisional application Ser. No. 15/165,713, filed on May 26, 2016 (now U.S. Pat. No. 10,097,393), which claims the benefit of U.S. Provisional Application No. 62/166,831, filed on May 27, 2015, and U.S. Provisional Application No. 62/266,253, filed on Dec. 11, 2015. The entire disclosures of the applications referenced above are incorporated herein by reference.

FIELD

The present disclosure relates generally to wireless communications, and more particularly to systems and methods to reduce peak to average power ratio (PAPR) for dual subcarrier modulated (DCM) transmissions in a wireless network.

BACKGROUND

High efficiency (HE) wireless network devices compliant with one or more 802.11 specifications of Institute of Electrical and Electronics Engineers (IEEE) communicate in frequency bands between 1 Gigahertz (GHz) and 6 GHz. Orthogonal Frequency Division Multiple Access (OFDMA) is a multi-user variant of a Orthogonal Frequency Division Multiplexing (OFDM) scheme, where multiple-access is achieved by assigning subsets of subcarriers to different users, allowing simultaneous data transmission by several users. In OFDMA, resources are allocated in two dimensional regions over time and frequency. A time region covers an entire data portion of an HE Physical Layer Convergence Protocol (PLCP) Protocol Data Unit (PPDU), and a frequency region includes a number of contiguous subcarriers. Similar to OFDM, OFDMA employs multiple subcarriers, but the subcarriers are divided into several groups of subcarriers where each group is denoted as a resource unit (RU). The grouping of subcarriers into groups of resource units is called sub-channelization. Sub-channelization defines sub-channels that can be allocated to stations depending on their channel conditions and service requirements. Using sub-channelization, an OFDMA system can potentially allocate different transmit powers to different allocations. In OFDMA, an OFDM symbol is constructed of subcarriers, the number of which is a function of a size of Fast Fourier Transform (FFT) used in the transmission of OFDM symbols.

SUMMARY

A system comprises a modulator, a repetition module, and a phase rotation module. The modulator is configured to (i) modulate data using dual sub-carrier modulation, and (ii) generate modulated symbols for transmission on a plurality of subcarriers. The repetition module is configured to repeat the modulated symbols from a first half of the plurality of subcarriers to a second half of the plurality of subcarriers. The phase rotation module is configured to rotate phase of the modulated symbols on selected subcarriers of the second half of the plurality of subcarriers.

In other features, the data is for a signal field of a high efficiency packet.

In other features, the data is for a data field of a high efficiency packet.

In other features, the selected subcarriers of the second half of the plurality of subcarriers include all of the second half of the plurality of subcarriers. The phase rotation module is configured to rotate the phase of the modulated symbols on all of the second half of the plurality of subcarriers by multiplying the modulated symbols on all of the second half of the plurality of subcarriers by (−1) or j.

In other features, the selected subcarriers of the second half of the plurality of subcarriers include alternate subcarriers of the second half of the plurality of subcarriers. The phase rotation module is configured to rotate the phase of the modulated symbols on the alternate subcarriers of the second half of the plurality of subcarriers by multiplying the modulated symbols on the alternate subcarriers of the second half of the plurality of subcarriers by (−1).

In other features, the selected subcarriers of the second half of the plurality of subcarriers include half of the second half of the plurality of subcarriers. The phase rotation module is configured to rotate the phase of the modulated symbols on the half of the second half of the plurality of subcarriers by multiplying the modulated symbols on the half of the second half of the plurality of subcarriers by (−1).

In other features, the repetition module is further configured to exchange positions of the modulated symbols on every two successive subcarriers when repeating the modulated symbols from the first half of the plurality of subcarriers to the second half of the plurality of subcarriers.

In other features, the modulator is configured to modulate the data using a modulation scheme with the dual sub-carrier modulation to generate the modulated symbols. The modulation scheme is Binary Phase Shift Keying modulation, Quadrature Phase Shift Keying modulation, or a Quadrature Amplitude Modulation.

In other features, the modulator is configured to map the modulated symbols to the plurality of subcarriers according to a modulation scheme used with the dual sub-carrier modulation.

In other features, the system further comprises an encoder configured to encode the data using a binary convolutional code or a low density parity check code selected based on a number of the plurality of subcarriers.

In other features, the system further comprises an interleaver configured to interleave the data using less number of columns than 802.11n and 802.11ac specifications of Institute of Electrical and Electronics Engineers (IEEE).

In other features, the system further comprises an interleaver configured to interleave the data using a parameter based on a number of bits assigned to a single axis in a constellation point in a spatial stream. The parameter is equal to a maximum of 1 and a number of coded bits per subcarrier in the data.

In still other features, a system comprises a phase rotation module to rotate phase of repeated symbols in a received signal to reverse phase rotation performed on the repeated symbols transmitted in a transmit signal. The system further comprises a combining module to combine the repeated symbols of the received signal after the phase of the repeated symbols of the received signal is reversed. The system further comprises a slicer to slice the combined repeated symbols to obtain estimated transmit symbols. The system further comprises a reconstruction module to reconstruct the transmit signal from the estimated transmit symbols. The system further comprises an offset estimation module to estimate carrier frequency offset between the received signal and the reconstructed transmit signal.

In other features, the repeated symbols in the received signal include data symbols.

In other features, the received signal is modulated using dual sub-carrier modulation.

In other features, the reconstruction module comprises a modulator and a repetition module. The modulator is configured to (i) modulate the estimated transmit symbols using a modulation scheme used to modulate the repeated symbols transmitted in the transmit signal, and (ii) generate modulated symbols. The repetition module is configured to repeat the modulated symbols from a first half of a plurality of subcarriers to a second half of the plurality of subcarriers using a repetition method used to repeat the repeated symbols transmitted in the transmit signal. The phase rotation module is configured to rotate phase of the modulated symbols on selected subcarriers of the second half of the plurality of subcarriers using a phase rotation method used to rotate the phase of the repeated symbols transmitted in the transmit signal.

In other features, the modulation scheme is dual sub-carrier modulation with Binary Phase Shift Keying modulation, Quadrature Phase Shift Keying modulation, or a Quadrature Amplitude Modulation.

In still other features, a method comprises modulating data using dual sub-carrier modulation to generate modulated symbols for transmission on a plurality of subcarriers. The method further comprises repeating the modulated symbols from a first half of the plurality of subcarriers to a second half of the plurality of subcarriers. The method further comprises rotating phase of the modulated symbols on selected subcarriers of the second half of the plurality of subcarriers.

In other features, the data is for a signal field of a high efficiency packet.

In other features, the data is for a data field of a high efficiency packet.

In other features, the selected subcarriers of the second half of the plurality of subcarriers include all of the second half of the plurality of subcarriers. Rotating the phase of the modulated symbols on the selected subcarriers of the second half of the plurality of subcarriers includes multiplying the modulated symbols on all of the second half of the plurality of subcarriers by (−1) or j.

In other features, the selected subcarriers of the second half of the plurality of subcarriers include alternate subcarriers of the second half of the plurality of subcarriers. Rotating the phase of the modulated symbols on the selected subcarriers of the second half of the plurality of subcarriers includes multiplying the modulated symbols on the alternate subcarriers of the second half of the plurality of subcarriers by (−1).

In other features, the selected subcarriers of the second half of the plurality of subcarriers include half of the second half of the plurality of subcarriers. Rotating the phase of the modulated symbols on the selected subcarriers of the second half of the plurality of subcarriers includes multiplying the modulated symbols on the half of the second half of the plurality of subcarriers by (−1).

In other features, the method further comprises exchanging positions of the modulated symbols on every two successive subcarriers when repeating the modulated symbols from the first half of the plurality of subcarriers to the second half of the plurality of subcarriers.

In other features, the method further comprises modulating the data using a modulation scheme with the dual sub-carrier modulation to generate the modulated symbols. The modulation scheme is Binary Phase Shift Keying modulation, Quadrature Phase Shift Keying modulation, or a Quadrature Amplitude Modulation.

In other features, the method further comprises mapping the modulated symbols to the plurality of subcarriers according to a modulation scheme used with the dual sub-carrier modulation.

In other features, the method further comprises encoding the data using a binary convolutional code or a low density parity check code selected based on a number of the plurality of subcarriers.

In other features, the method further comprises interleaving the data using less number of columns than 802.11n and 802.11ac specifications of Institute of Electrical and Electronics Engineers (IEEE).

In other features, the method further comprises interleaving the data using a parameter based on a number of bits assigned to a single axis in a constellation point in a spatial stream. The parameter is equal to a maximum of 1 and a number of coded bits per subcarrier in the data.

In still other features, a method comprises rotating phase of repeated symbols in a received signal to reverse phase rotation performed on the repeated symbols transmitted in a transmit signal. The method further comprises combining the repeated symbols of the received signal after the phase of the repeated symbols of the received signal is reversed. The method further comprises slicing the combined repeated symbols to obtain estimated transmit symbols. The method further comprises reconstructing the transmit signal from the estimated transmit symbols. The method further comprises estimating carrier frequency offset between the received signal and the reconstructed transmit signal.

In other features, the repeated symbols in the received signal include data symbols.

In other features, the received signal is modulated using dual sub-carrier modulation.

In other features, reconstructing the transmit signal comprises modulating the estimated transmit symbols to generate modulated symbols using a modulation scheme used to modulate the repeated symbols transmitted in the transmit signal, repeating the modulated symbols from a first half of a plurality of subcarriers to a second half of the plurality of subcarriers using a repetition method used to repeat the repeated symbols transmitted in the transmit signal, and rotating phase of the modulated symbols on selected subcarriers of the second half of the plurality of subcarriers using a phase rotation method used to rotate the phase of the repeated symbols transmitted in the transmit signal. The modulation scheme is dual sub-carrier modulation with Binary Phase Shift Keying modulation, Quadrature Phase Shift Keying modulation, or a Quadrature Amplitude Modulation.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A transmit signal having a high peak to average power ratio (PAPR) is one of the main challenges in wideband multi-carrier systems that use orthogonal frequency division multiplexing (OFDM) or multiple-input multiple-output (MIMO) OFDM. Using a large number of subcarriers introduces a high PAPR in OFDM systems. PAPR can be defined as a relationship between a maximum power of a sample in a transmit OFDM symbol and its average power:

$$PAPR = 10\log_{10}\frac{P_{peak}}{P_{average}}(dB)$$

where $P_{peak}$ and $P_{average}$ respectively denote peak and average power of a given OFDM symbol.

When a large number of subcarriers are out of phase, a significant PAPR can cause a transmitter's power amplifier (PA) to operate in a non-linear region. This causes significant signal distortion at an output of the power amplifier. In addition, a high PAPR can cause saturation at the transmitter's digital-to-analog converter (DAC), leading to saturation of the power amplifier. A high PAPR can also cause inter-modulation between the subcarriers and distort a transmit signal constellation. Accordingly, high PAPR results in inter-carrier interference, high out-of-band radiation, and bit error rate (BER) performance degradation, mainly due to the nonlinearity of the power amplifier.

The present disclosure proposes novel systems and methods to reduce PAPR in transmissions, e.g., high efficiency (HE) transmissions, using dual sub-carrier modulation (DCM). Specifically, the present disclosure proposes PAPR reduction using several symbol repetition and phase rotation methods described below in detail. Further, new interleaving parameters are proposed. Additionally, on the receiver side, new methods for data-aided carrier frequency offset (CFO) estimation are disclosed.

Figure 1:
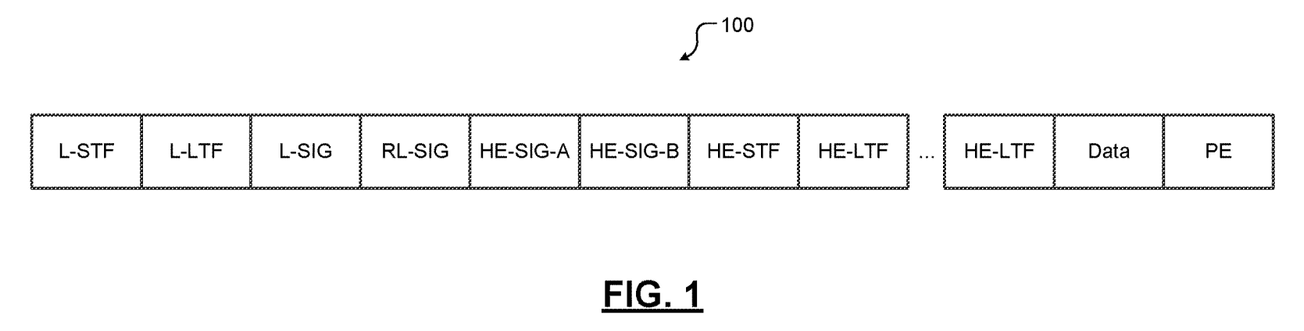
FIG. 1 shows a format of a high efficiency (HE) packet.

FIG. 1 shows a format of a high efficiency (HE) multi user (MU) Physical Layer Convergence Protocol (PLCP) Protocol Data Unit (PPDU) 100. The HE MU PPDU (hereinafter "the packet") 100 includes the following fields: a non-high throughput (HT) short training field (L-STF), a non-HT long training field (L-LTF), a non-HT signal field (L-SIG), a repeated non-HT signal field (RL-SIG), an HE signal A field (HE-SIG-A), an HE signal B field (HE-SIG-B), an HE short training field (HE-STF), one or more HE long training field (HE-LTF), a data field carrying one or more Physical layer Service Data Units (PSDUs) (or simply payloads), and a packet extension (PE) field.

The L-STF and L-LTF fields are used by receivers for timing synchronization, gain control, and so on. The L-SIG field is used to communicate data rate and packet length information. The RL-SIG field is used to identify a HE PPDU. The HE-SIG-A field carries information required to interpret HE PPDUs. The HE-SIG-B field carries resource allocation information. The HE-STF field improves automatic gain control in a MIMO transmission. The HE-LTF field aides the receiver to estimate the MIMO channel. The data field of the HE PPDU 100 carries data (payload) for one or more users.

The HE portion of HE format preamble includes pre-HE modulated fields and HE modulated fields. The HE modulated fields include the HE-STF and HE-LTF fields as shown in FIG. 1. The pre-HE modulated fields depend on the structure of the HE PPDU 100. For example, in a HE MU PPDU, the pre-HE modulated fields include the RL-SIG, HE-SIG-A, and HE-SIG-B fields as shown in FIG. 1.

Figure 2:
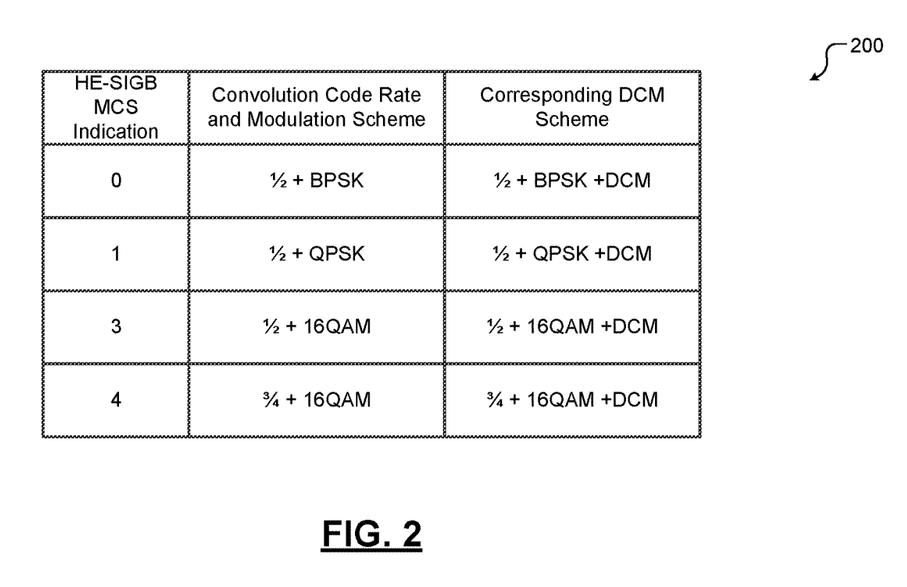
FIG. 2 shows a table of modulation and coding schemes (MCSs) that can be used with dual sub-carrier modulation (DCM) to transmit the packet of FIG. 1.

FIG. 2 shows a table 200 including HE modulation and coding scheme (MCS) values indicating the modulation and coding that can be used to transmit the HE-SIG-B field and the data field of the PPDU. When used, dual sub-carrier modulation (DCM) modulates the same information on a pair of sub-carriers. DCM is an optional modulation scheme for the HE-SIG-B and data fields in an HE PPDU. DCM is only applied to BPSK, QPSK and 16-QAM modulations. For a given MCS, the modulation size is increased from M to $M^2$, thus reducing the number of modulated symbols by half. An $N^{th}$ modulated symbol is transmitted on both subcarrier n and subcarrier n+N/2, where N is the number of available subcarriers.

Figure 3:
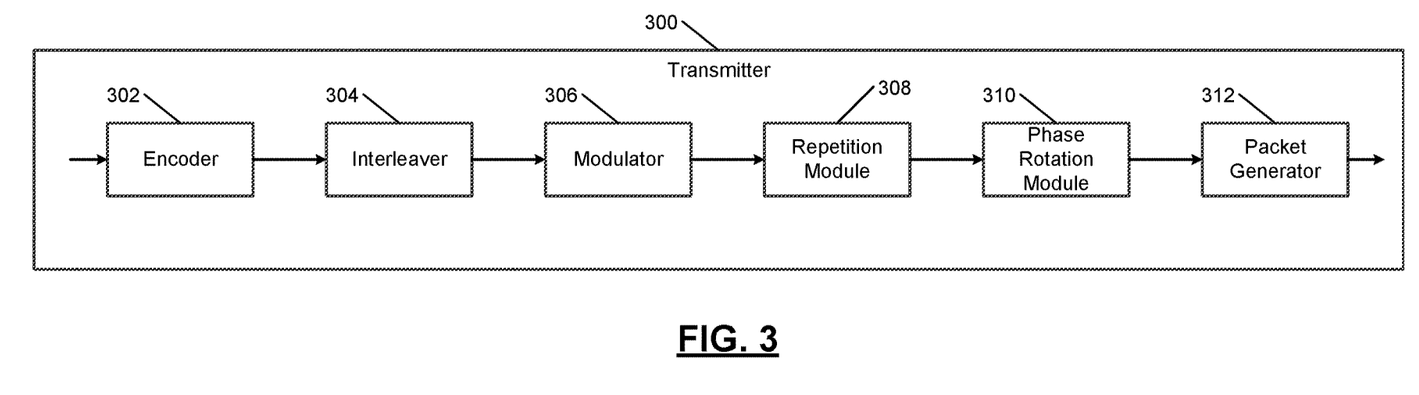
FIG. 3 is a functional block diagram of a transmitter that transmits the packet of FIG. 1 using the MCSs of FIG. 2 according to an implementation of the present disclosure.

FIG. 3 shows a transmitter 300 for transmitting the HE packet 100 shown in FIG. 1 using a modulation and coding scheme (MCS) shown in FIG. 2 according to an implementation of the present disclosure. Specifically, the transmitter 300 transmits a preamble field (e.g., the HE-SIG-B field, hereinafter "the signal field") and a data field of the HE packet 100 shown in FIG. 1 as follows. The transmitter 300 includes an encoder 302, an interleaver 304, a modulator 306, a repetition module 308, a phase rotation module 310, and a packet generator 312. The repetition module 308 and the phase rotation module 310 respectively perform symbol repetition and phase rotation described below to reduce PAPR and can be collectively called a PAPR control module.

The encoder 302 encodes the data to be transmitted in the signal field and/or the data field using binary convolutional coding (BCC) (e.g., for resource unit (RU) sizes less than or equal to 242 tones (transmit and receive)) or low-density parity check (LDPC) coding (e.g., for RU sizes of 484 tones, 996 tones (transmit and receive)). Tones are subcarriers; therefore tones and subcarriers are used interchangeably throughout the present disclosure.

Additionally, the encoder 302 may use puncturing to achieve a data rate selected by the modulation and coding scheme (MCS). Puncturing allows generating codes of different rates using a single encoder. A punctured code is obtained by periodically deleting (or puncturing) encoded bits from encoded sequences. Puncturing has the effect of reducing the number of encoded bits, which increases code rate. Thus, a low rate encoder can be used to generate many high rate codes by selecting a puncturing pattern.

After coding and puncturing, the bit streams at the output of the encoder 302 are processed in groups of $N_{CBPS}$ bits, where $N_{CBPS}$ is the number of coded bits per subcarrier. Each of these groups is rearranged into $N_{SS}$ blocks of $N_{CBPSS}$ bits ($N_{SS,u}$ blocks of $N_{CBPSS,u}$ bits in the case of a HE MU transmission), where $N_{SS}$ is the number of spatial streams, u is the user index, and $N_{CBPSS}$ is the number of coded bits per spatial stream. This operation is called "stream parsing" and is described herein in terms of an SU transmission. For MU transmissions, the rearrangements are carried out similarly per user.

The number of bits assigned to a single axis (real or imaginary) in a constellation point in a spatial stream is denoted by $s=\max(1, N_{BPSCS}/2)$. The sum of these over all of the streams is $S=N_{SS} \cdot s$. Consecutive blocks of s bits are assigned to different spatial streams in a round robin fashion. If $N_{Block}=[N_{CBPS}/S]$, then for the $N_{Block} \cdot S$ bits of each OFDM symbol, S bits from the output of the encoder 302 are divided among all spatial streams, s bits per stream. Note that in all of the different resource unit (RU) sizes, $N_{CBPS}=N_{Block} \cdot S$. Accordingly, the coded bits of each OFDM symbol are evenly allocated to $N_{SS}$ spatial streams.

The interleaver 304 interleaves the encoded data. The interleaver parameters specified by IEEE 802.11n/802.11ac standards do not work well with the transmitter 300 designed to work with the emerging IEEE 802.11ax standard. Instead, the present disclosure proposes new interleaver parameters that work well with the transmitter 300 designed to work with the emerging IEEE 802.11ax standard. Following are some examples of the proposed new interleaver parameters according to implementations of the present disclosure.

For system with 48 data sub-carriers like IEEE 802.11a, the interleaver parameter used in IEEE 802.11n/802.11ac is $$N_{COL} = 16, s = \max\left\{1, \frac{N_{BPSC}}{2}\right\}.$$

Instead, the proposed interleaver parameter is $N_{COL}=8$, $s=\max\{1, N_{BPSC}\}$.

For system with 52 data sub-carriers like IEEE 802.11a, the interleaver parameter used in 11n/ac is $$N_{COL} = 13, s = \max\left\{1, \frac{N_{BPSC}}{2}\right\}.$$

Instead, the proposed interleaver parameter is $N_{COL}=6$ or 7, $s=\max\{1, N_{BPSC}\}$.

The modulator 306 modulates the interleaved encoded data and generates modulated symbols. A mapping between input bits of a constellation mapper (i.e., the modulator 306) and complex constellation points for BPSK, QPSK, and 16-QAM modulation schemes is called constellation mapping. Dual sub-carrier modulation (DCM) is an optional modulation scheme for the HE-SIG-B and data (payload) fields. DCM is applied to BPSK, QPSK and 16-QAM modulations.

When DCM is used, bit sequences are mapped to a pair of symbols ($d_k$, $d_{q(k)}$), where k is in a range of $0 \leq k \leq (N_{SD}/2-1)$, where $N_{SD}$ is the number of available data-subcarriers; and q(k) is in a range of $N_{SD}/2 \leq k \leq (N_{SD}-1)$ to exploit frequency diversity. To maximize frequency diversity, index of a pair of DCM subcarriers (k, q(k)) is $q(k)=k+N_{SD}/2$.

For QPSK modulation with DCM, the input stream is divided into groups of $N_{CBPS}$ or $N_{CBPS,ru}$ bits ($B_0, B_1, \ldots, B_{NCBPS,ru-1}$). Each pair of bits ($B_{2k}, B_{2k+1}$) is QPSK modulated to a symbol $d_k$. This generates constellation points for the lower half the data subcarriers in the resource unit (RU). For the upper half of the data sub-carriers in the RU, $d_{q(k)}=\text{conj}(d_k)$.

The repetition module 308 repeats the modulated symbols as follows to improve PAPR. Traditionally, after interleaving, $N_{CBPS}=N_{SD} \cdot N_{BPSC}$ bits are modulated into $N_{SD}$ symbols with a constellation of size $2^{N_{BPSC}}$, where $N_{SD}$ is the number of available data-subcarriers, $N_{CBPS}$ is the number of coded bits per subcarrier, and $N_{BPSC}$ is the number of bits per subcarrier.

With DCM, after interleaving, $N_{CBPS}=N_{SD} \cdot N_{BPSC}$ bits are modulated into $$\frac{N_{SD}}{2}$$

symbols with a constellation of size $2^{2 \cdot N_{BPSC}}$, and the $$\frac{N_{SD}}{2}$$

number of modulated symbols are mapped onto $N_{SD}$ data sub-carriers by repetition.

Equivalently, for DCM, after interleaving, the $N_{CBPS}$ number of coded bits are repeated to form $2 \cdot N_{CBPS}$ bits, then modulated into $N_{SD}$ symbols with a constellation of size $2^{2 \cdot N_{BPSC}}$, and then mapped onto $N_{SD}$ data sub-carriers.

Mathematically, the bit repetition can be represented as:

$$x_{k+N_{CBPS}}^{DCM} = x_k^{DCM}, k \in [0, N_{CBPS}-1].$$

Consequently, the symbol repetition can be represented as:

$$d_{k+\frac{N_{SD}}{2}}^{DCM} = d_k^{DCM}, k \in \left[0, \frac{N_{SD}}{2} - 1\right]$$

Simply repeating modulated symbols, however, can cause high PAPR. To reduce PAPR, the present disclosure proposes applying either phase-rotation or conjugate, or both to the second half of the symbols after modulation as follows:

$$d_k^{DCM} = (d_k^{DCM})^*, k \in \left[\frac{N_{SD}}{2}, N_{SD} - 1\right]$$

$$d_k^{DCM} = e^{j\varphi} \cdot d_k^{DCM}, k \in \left[\frac{N_{SD}}{2}, N_{SD} - 1\right]$$

$$d_k^{DCM} = e^{j\varphi}(d_k^{DCM})^*, k \in \left[\frac{N_{SD}}{2}, N_{SD} - 1\right]$$

$$\varphi = \frac{\pi}{2}, \pi, \frac{3\pi}{2}$$

Further, swapping bits, flipping bits, or both can improve PAPR. Bit swapping means if bits b1, b2, b3, b4, . . . are repeated, then the repeated bits are b2, b1, b4, b3, . . . . That is, bit positions of every two successive bits are interchanged or swapped or exchanged. The bit swapping can be represented as:

$$\begin{cases} x_{2k+N_{CBPS}}^{DCM} = x_{2k+1}^{DCM} \\ x_{2k+1+N_{CBPS}}^{DCM} = x_{2k}^{DCM} \end{cases}, k \in \left[0, \frac{N_{CBPS}}{2} - 1\right]$$

Bit flipping means if bits b1, b2, b3, b4, . . . are repeated, then the repeated bits are flipped or inverted bits b1', b2', b3', b4', . . . . That is, if a bit $b_i$ before repeating is 0, the flipped bit $b_i'$ is 1; and if a bit $b_i$ before repeating is 1, the flipped bit $b_i'$ is 0. The bit flipping can be represented as:

$$\begin{cases} x_{2k+N_{CBPS}}^{DCM} = 1 - x_{2k}^{DCM} \\ x_{2k+1+N_{CBPS}}^{DCM} = 1 - x_{2k+1}^{DCM} \end{cases}, k \in \left[0, \frac{N_{CBPS}}{2} - 1\right]$$

Further, swapping and flipping bits means if bits b1, b2, b3, b4, . . . are repeated, then the repeated bits are b2', b1', b4', b3', . . . . That is, bit positions of every two successive bits are interchanged or swapped or exchanged and additionally each repeated bit is flipped or inverted (from 0 to 1 or from 1 to 0). The bit swapping and flipping can be represented as:

$$\begin{cases} x_{2k+N_{CBPS}}^{DCM} = x_{2k+1}^{DCM} \\ x_{2k+1+N_{CBPS}}^{DCM} = x_{2k}^{DCM} \end{cases}, k \in \left[0, \frac{N_{CBPS}}{2} - 1\right]$$

The phase rotation module 310 rotates the phase of the repeated modulated symbols as follows to reduce PAPR. When DCM is used, the QPSK/16QAM symbols are based on two different mappings on each half of the tones (data subcarriers). For example, QPSK symbols are conjugated on the second half of the tones (data subcarriers) to reduce PAPR.

Figure 4A:
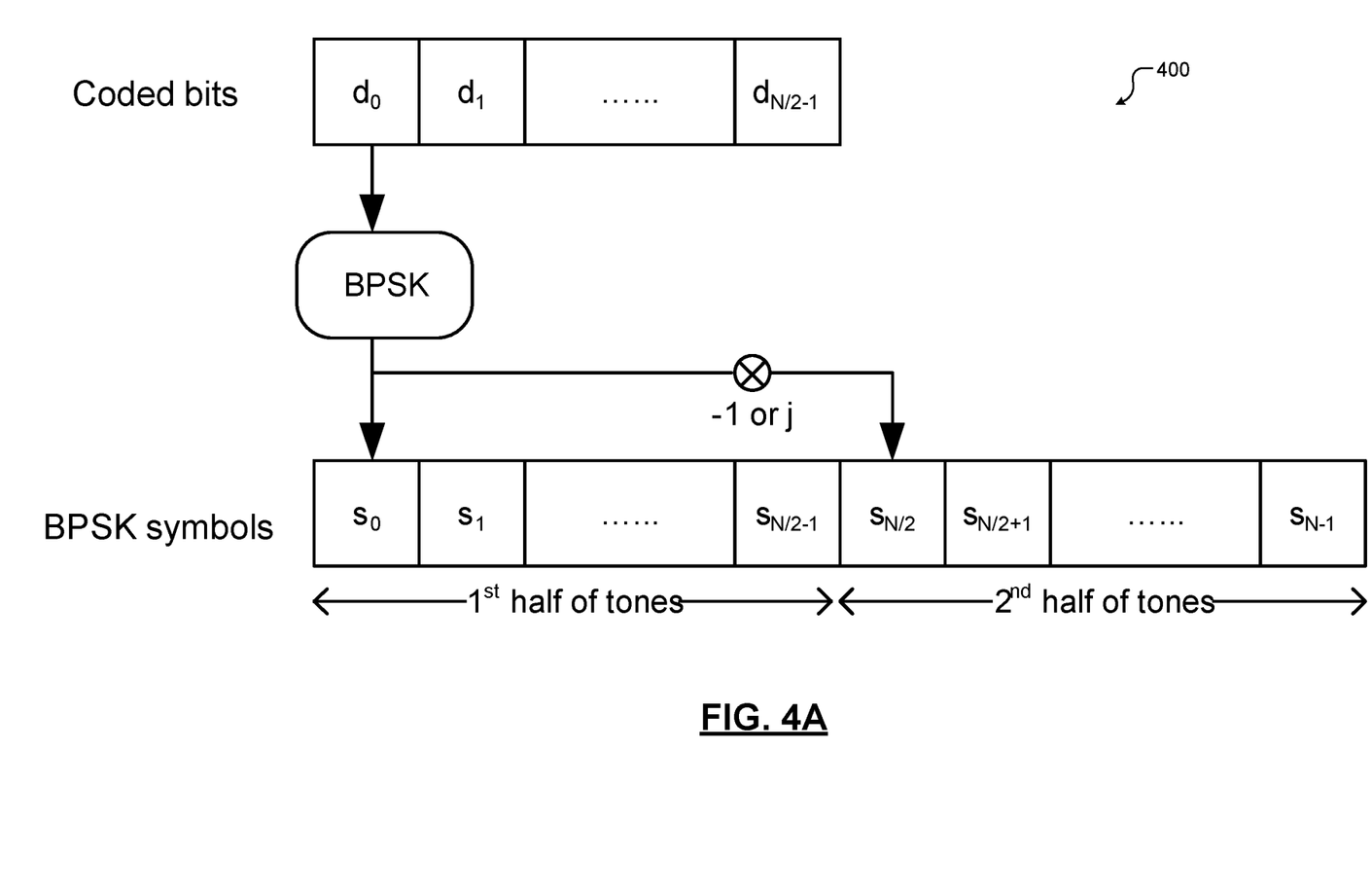
FIGS. 4A-4C show different methods for repeating and rotating symbols before transmission according to an implementation of the present disclosure.
Figure 4B:
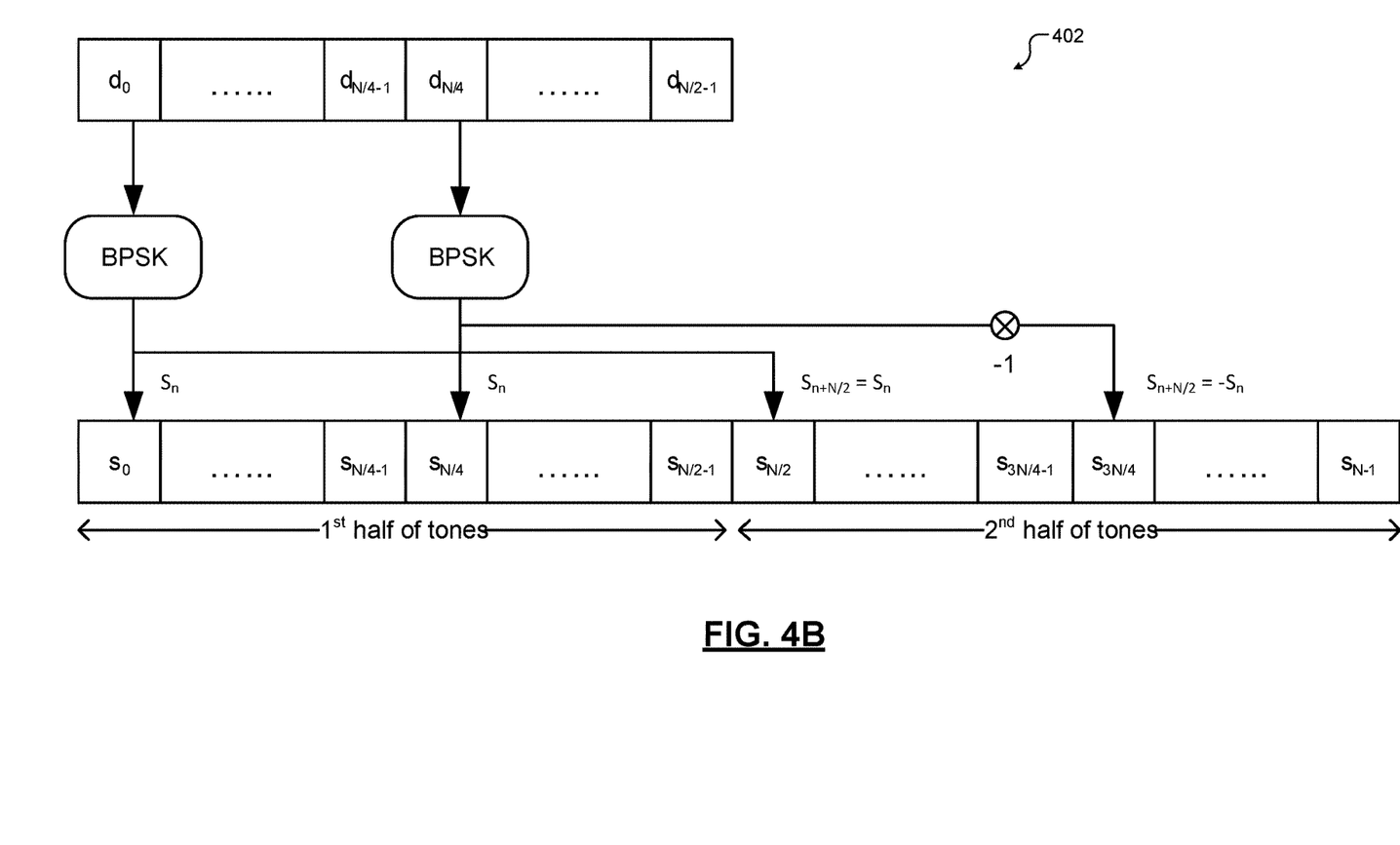
Figure 4C:
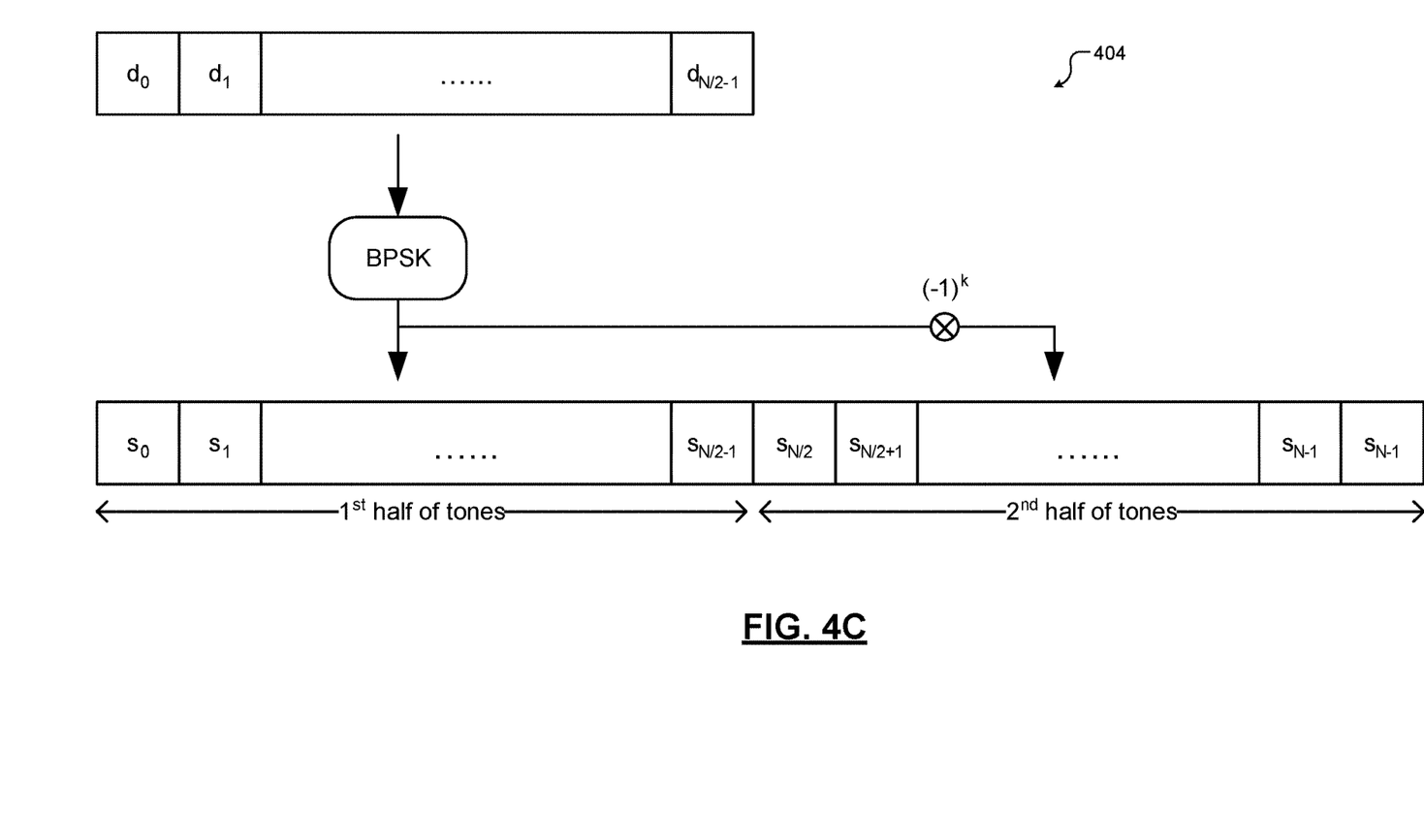

FIGS. 4A-4C show examples of several alternate methods for rotating phase of repeated BPSK symbols to reduce PAPR. FIG. 4A shows a one phase rotation method 400. For each half of the tones, the modulated symbols are [$s_0$, . . . , $s_{N/2-1}$], and [$s_{N/2}$, . . . , $s_{N-1}$]. The modulated symbols on second half of the tones (data subcarriers) can be multiplied with a phase rotation. For example, the modulated symbols on the first/second half are multiplied with [1 –1] or [1 j].

FIG. 4B shows an example of a two phase rotations method 402. The modulated symbols on the second half of the tones (data subcarriers) can be multiplied with two phases. For example, each quarter of the tones are multiplied with [1 1 1 –1]. Mathematically, if $S_n$ is the BPSK symbol on an $n^{th}$ data tone (data subcarrier), $S_{n+N/2}=S_n$ for $0 \leq n < N/4$, and $S_{n+N/2}=-S_n$ for $N/4 \leq n \leq N/2$.

FIG. 4C shows another example of a two phase rotations method 404. The modulated symbols on every other tone (data subcarrier) of the second half of the tones (data subcarriers) have their signs flipped. The modulated symbols on the first half of the tones are repeated on the second half of the tones. Then the modulated symbols on odd tones in the second half of the tones have their sign flipped. Mathematically, for $0 \leq n < N/2$, $S_{n+N/2}=(-1)^n S_n$. In FIG. 4C, k denotes a tone (subcarrier) index; for odd k, the sign of the symbol is flipped; for even k, the sign of the symbol is not flipped.

The phase rotation methods 400, 402, 404 shown in FIGS. 4A-4C can be summarized as follows. Multiplier [1 1]: directly repeat symbols with no phase rotation (not shown). Multiplier [1 –1] or [1 j]: one phase rotation; symbols on the second half of the tones multiplied with –1 or j (the method 400 of FIG. 4A). Multiplier [1 1 1 –1]: two phase rotations; symbols on third and fourth quarter of the tones multiplied with 1 and –1 respectively (the method 402 of FIG. 4B). Multiplier [1 1 +/–1]: two phase rotations; flipping sign of symbols on odd tones in the second half of the tones (the method 406 of FIG. 4C).

The packet generator 312 generates a packet (e.g., the packet 100 shown in FIG. 1) including the signal field and/or the data (payload) field with symbols modulated, repeated, and rotated as described above. The transmitter 300 transmits the packet.

Figure 5:
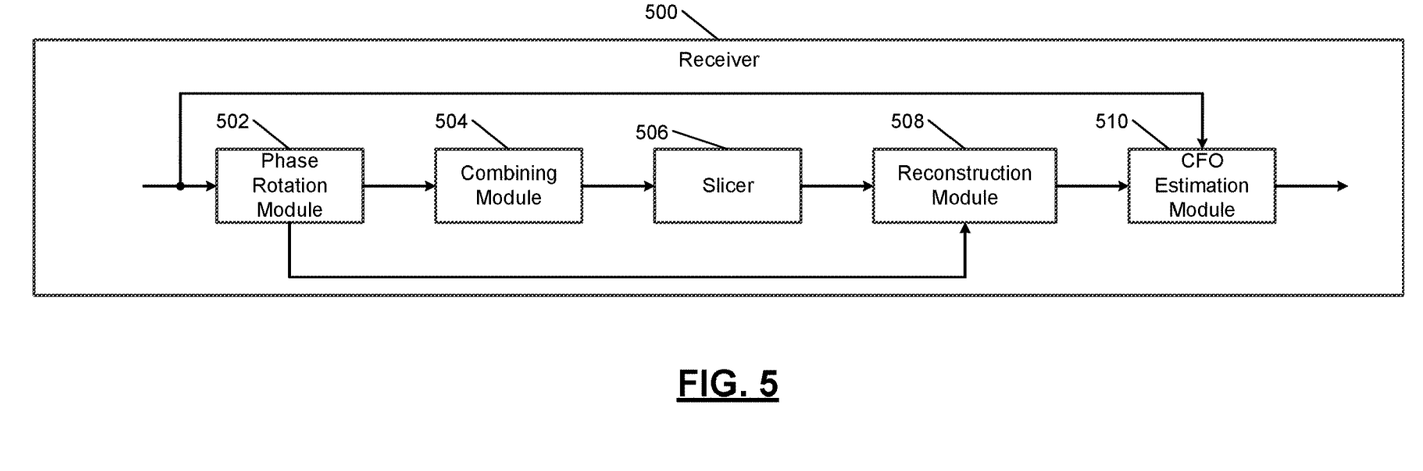
FIG. 5 is a functional block diagram of a receiver that estimates a carrier frequency offset (CFO) according to an implementation of the present disclosure when the packet of FIG. 1 transmitted by the transmitter of FIG. 3 using the MCSs of FIG. 2 is received.

FIG. 5 shows a receiver 500 that receives the packet shown in FIG. 1 transmitted by the transmitter 300 and that determines a carrier frequency offset (CFO) between the transmitted and received packets as follows. While not shown, the transmitter 300 transmits the packet from a first wireless device to a receiver 500 of a second network device. The CFO is used to synchronize the receiver 500 of the second wireless device to the transmitter 300 of the first wireless device.

Typically, receivers determine the CFO based on pilot tones (pilot subcarriers) of a received signal. In contrast, the present disclosure proposes determining the CFO using the data tones (data subcarriers or subcarriers used to carry user data or payload (e.g., data in the data field of the packet shown in FIG. 1)). Since the data tones are far greater in number than the pilot tones, the proposed method of determining the CFO using the data tones improves the reliability of the CFO estimation.

The receiver 500 includes a phase rotation module 502, a combining module 504, a slicer 506, a reconstruction module 508, and a CFO estimation module 510. The phase rotation module 502 reverses the phase rotation of the repeated symbols received in a received signal that was applied to the repeated symbols when the repeated symbols are transmitted by the transmitter 300 in a transmit signal. In other words, the phase rotation module 502 is configured to undo or nullify the controls (e.g., phase rotation) that were applied to the transmitted symbols to reduce PAPR. Reversing, or undoing, or nullifying these controls at the receiver 500 is also called a de-PAPR control operation.

After the phase rotation of the repeated symbols is reversed or undone, the combining module 504 combines the repeated symbols. The slicer 506 slices the combined repeated symbols to obtain estimated transmit symbols. A slicer or clipper is a device designed to prevent an output of a circuit from exceeding a predetermined voltage level without distorting the remainder of the waveform. A slicer is used to select a part of a signal waveform that lies above or below a predetermined reference voltage level. Thus a slicer can remove some portions of a waveform near the positive or negative peaks. Depending on the repetition method and modulation used, the combining module 504 and the slicer 506 can perform different operations as follows.

For example, when the repeated bits are modulated using QPSK modulation with DCM during transmission, at the receiver 500, after the de-PAPR control operation, each QPSK symbol is first decomposed or split into two BPSK modulated symbol, and then a maximal ratio combining (MRC) operation is performed for each repeated symbol, followed by slicing to obtain a hard decision.

If simply repeating is used (i.e., if bit swapping, bit flipping, or both are not used), and the repeated bits are modulated using 16QAM modulation with DCM during transmission, at the receiver 500, after the de-PAPR control operation, each 16QAM symbol is first decomposed or split into two 4-PAM modulated symbols, and then the MRC combining operation is performed for each repeated 2-bits, followed by performing slicing on the 4-PAM modulated symbols to obtain a hard decision.

If bit swapping, bit flipping, or both are used, and the repeated bits are modulated using 16QAM modulation with DCM during transmission, at the receiver 500, after the de-PAPR control operation, each 16QAM symbol is first decomposed or split into two 4-PAM modulated symbols, and then instead of performing the MRC combining operation, a joint decoding operation is performed for each repeated 2-bits to obtain a hard decision. The joint decoding operation can be performed by calculating posteriori probability for the four combinations of the 2-bits and then selecting the combination with maximum probability. Alternatively, log likelihood ratio (LLR) calculation of each bit on each symbol can be performed separately, and then an LLR addition operation is performed, followed by obtaining a hard decision for the two bits separately.

The reconstruction module 508 reconstructs or regenerates the transmit signal from the estimated transmit symbols. For example, the reconstruction module 508 re-modulates the estimated transmit symbols using a modulation scheme with DCM that was used by the modulator 306 of the transmitter 300 to transmit the transmit signal. Additionally, the reconstruction module 508 repeats the modulated symbols similar to the repetition performed by the repetition module 308 of the transmitter 300 when transmitting the transmit signal. The phase rotation module 502 rotates the repeated modulated symbols similar to the phase rotation performed by the phase rotation module 310 of the transmitter 300 when transmitting the transmit signal.

The CFO estimation module 510 estimates the CFO between the received signal and the reconstructed transmit signal. The CFO estimation module 510 estimates the CFO between the received signal and the reconstructed transmit signal based on the data symbols transmitted by the transmitter 300 and not based on pilot symbols transmitted by the transmitter 300. Accordingly, the CFO estimated by the CFO estimation module 510 based on the data symbols is more accurate and reliable than the CFO estimation based on the pilot symbols. The receiver 500 uses the estimated CFO to synchronize with the transmitter 300.

Figure 6:
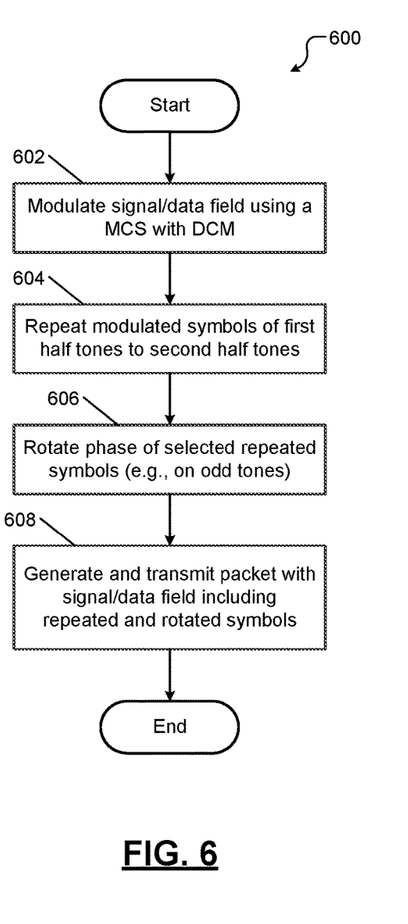
FIG. 6 shows a flowchart of a method for transmitting the packet of FIG. 1 using the modulation and coding schemes of FIG. 2 according to an implementation of the present disclosure.

FIG. 6 shows a method 600 for generating and transmitting an HE packet (e.g., the packet 100 of FIG. 1) according to an implementation of the present disclosure. Initially, the encoder 302 and the interleaver 304 of the transmitter 300 of FIG. 3 respectively encode and interleave data to be transmitted in the HE packet. For example, the encoder 302 of the transmitter 300 of FIG. 3 encodes the data to be transmitted in the HE packet using a suitable code (e.g., BCC or LDPC code selected based on resource allocation (RU)). Further, the interleaver 304 of the transmitter 300 of FIG. 3 interleaves the encoded data using an interleaver parameter (e.g., no. of columns less than IEEE 802.11n/802.11ac and s as described with reference to FIG. 3 above) according to the present disclosure.

At 602, control (e.g., the modulator 306 of the transmitter 300 of FIG. 3) modulates the encoded interleaved data of a preamble field (e.g., the signal field HE-SIG-B) and/or a data field of the HE packet using a modulation scheme with DCM. At 604, control (e.g., the repetition module 308 of the transmitter 300 of FIG. 3) repeats modulated symbols from a first half of the subcarriers to a second half of the subcarriers (e.g., using swapping and/or flipping). At 606, control (e.g., the phase rotation module 310 of the transmitter 300 of FIG. 3) rotates the phase of selected repeated modulated symbols (e.g., all of the repeated symbols, alternate repeated symbols, or half of the repeated symbols) on the second half of the subcarriers (e.g., by using method 400, 402, or 404 of FIGS. 4A-4C). At 608, control (e.g., the packet generator 312 of the transmitter 300 of FIG. 3) generates and transmits the HE packet (e.g., the packet 100 of FIG. 1) with the signal and/or data fields including the repeated and rotated modulated symbols.

Figure 7:
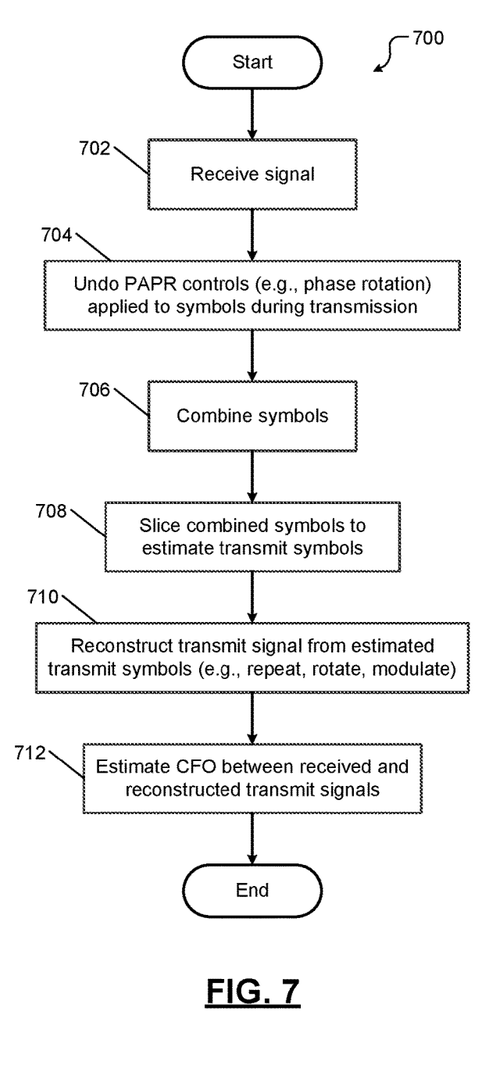
FIG. 7 shows a flowchart of a method for estimating the CFO according to an implementation of the present disclosure when the packet of FIG. 1 transmitted by the transmitter of FIG. 3 using the MCSs of FIG. 2 is received.

FIG. 7 shows a method 700 for estimating a carrier frequency offset (CFO) at a receiver (e.g., the receiver 500 of FIG. 5) according to an implementation of the present disclosure. At 702, control (e.g., the receiver 500 of FIG. 5) receives a signal transmitted with PAPR control (e.g., from the transmitter 300 of FIG. 3). At 704, control (e.g., the phase rotation module 502 of the receiver 500 of FIG. 5) reverses the PAPR control (e.g., phase rotation) that was applied to the transmitted symbols (e.g., by the phase rotation module 310 of the transmitter 300 of FIG. 3). At 706, after the PAPR control is undone, control (e.g., the combining module 504 of the receiver 500 of FIG. 5) combines the received symbols. At 708, control (e.g., the slicer 506 of the receiver 500 of FIG. 5) slices the combined symbols to generate estimates of the transmitted symbols. At 710, control (e.g., the reconstruction module 508 of the receiver 500 of FIG. 5) reconstructs the transmitted signal based on the estimates of transmitted symbols (e.g., by modulating, repeating, and rotating symbols as in the transmitter 300 of FIG. 3). At 712, control (e.g., the CFO estimation module 510 of the receiver 500 of FIG. 5) estimates the CFO between the received signal and the reconstructed transmitted signal.

In an implementation of the present disclosure, the packet 100 of FIG. 1 is compliant with draft IEEE standard 802.11ax, the transmitter 300 and the receiver 500 of FIGS. 3 and 5 are compliant with draft IEEE standard 802.11ax, and the methods 600 and 700 of FIGS. 6 and 7 are compliant with draft IEEE standard 802.11ax.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, draft IEEE standard 802.11ah and/or draft IEEE standard 802.11ax.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a modulator configured to (i) modulate data using a first modulation scheme and dual sub-carrier modulation, wherein the dual sub-carrier modulation modulates the same information on a pair of subcarriers, and (ii) generate modulated symbols for transmission on a plurality of subcarriers;
   a repetition module configured to repeat the modulated symbols from a first half of the plurality of subcarriers to a second half of the plurality of subcarriers; and
   a phase rotation module configured to rotate phase of the modulated symbols on selected subcarriers of the second half of the plurality of subcarriers,
   wherein the selected subcarriers of the second half of the plurality of subcarriers include at least one half of the second half of the plurality of subcarriers.

2. The system of claim 1 wherein:
   the selected subcarriers of the second half of the plurality of subcarriers include all of the second half of the plurality of subcarriers; and
   the first modulation scheme is Quadrature Phase Shift Keying (QPSK) or Quadrature Amplitude Modulation (QAM).

3. The system of claim 2 wherein the phase rotation module is configured to rotate the phase of the modulated symbols on all of the second half of the plurality of subcarriers to conjugate the modulated symbols on all of the second half of the plurality of subcarriers relative to corresponding modulated symbols on all of the first half of the plurality of subcarriers.

4. The system of claim 1 wherein:
   the selected subcarriers of the second half of the plurality of subcarriers include one half of the second half of the plurality of subcarriers; and
   the first modulation scheme is Binary Phase Shift Keying (BPSK).

5. The system of claim 4 wherein the phase rotation module is configured to rotate the phase of the modulated symbols on one half of the second half of the plurality of subcarriers by multiplying the modulated symbols on one half of the second half of the plurality of subcarriers by (−1).

6. The system of claim 1, wherein the modulator is configured to modulate the data for at least one of a signal field and a data field of a high efficiency packet.

7. The system of claim 1, wherein the modulator is configured to map the modulated symbols to the plurality of subcarriers according to the first modulation scheme used with the dual sub-carrier modulation.

8. The system of claim 1, further comprising an encoder configured to encode the data using a binary convolutional code or a low density parity check code selected based on a number of the plurality of subcarriers.

9. The system of claim 1, further comprising an interleaver configured to interleave the data using a lesser number of columns than a number of columns specified in 802.11n and 802.11ac specifications of Institute of Electrical and Electronics Engineers (IEEE).

10. The system of claim 1, further comprising an interleaver configured to interleave the data using a parameter based on a number of bits assigned to a single axis in a constellation point in a spatial stream, wherein the parameter is equal to a maximum of 1 and a number of coded bits per subcarrier in the data.

11. A method comprising:
    modulating data using a first modulation scheme and dual sub-carrier modulation to generate modulated symbols for transmission on a plurality of subcarriers, wherein the dual sub-carrier modulation modulates the same information on a pair of subcarriers;
    repeating the modulated symbols from a first half of the plurality of subcarriers to a second half of the plurality of subcarriers;
    selecting at least one half of the second half of the plurality of subcarriers; and
    rotating phase of the modulated symbols on the selected subcarriers of the second half of the plurality of subcarriers.

12. The method of claim 11 further comprising:
    selecting all of the second half of the plurality of subcarriers,
    wherein the first modulation scheme is Quadrature Phase Shift Keying (QPSK) Modulation or Quadrature Amplitude Modulation (QAM).

13. The method of claim 12 wherein rotating the phase of the modulated symbols on the selected subcarriers of the second half of the plurality of subcarriers includes rotating the phase of the modulated symbols on all of the second half of the plurality of subcarriers to conjugate the modulated symbols on all of the second half of the plurality of subcarriers relative to corresponding modulated symbols on all of the first half of the plurality of subcarriers.

14. The method of claim 11 further comprising:
    selecting one half of the second half of the plurality of subcarriers,
    wherein the first modulation scheme is Binary Phase Shift Keying (BPSK).

15. The method of claim 14 wherein rotating the phase of the modulated symbols on the selected subcarriers of the second half of the plurality of subcarriers includes rotating the phase of the modulated symbols on one half of the second half of the plurality of subcarriers by multiplying the modulated symbols on one half of the second half of the plurality of subcarriers by (−1).

16. The method of claim 11, wherein the modulating comprises modulating the data for at least one of a signal field and a data field of a high efficiency packet.

17. The method of claim 11, further comprising mapping the modulated symbols to the plurality of subcarriers according to the first modulation scheme used with the dual sub-carrier modulation.

18. The method of claim 11, further comprising encoding the data using a binary convolutional code or a low density parity check code selected based on a number of the plurality of subcarriers.

19. The method of claim 11, further comprising interleaving the data using a lesser number of columns than the number of columns specified in 802.11n and 802.11ac specifications of Institute of Electrical and Electronics Engineers (IEEE).

20. The method of claim 11, further comprising interleaving the data using a parameter based on a number of bits assigned to a single axis in a constellation point in a spatial stream, wherein the parameter is equal to a maximum of 1 and a number of coded bits per subcarrier in the data.

* * * * *